No. 682,906. Patented Sept. 17, 1901.
C. E. BLUE.
MACHINE FOR THE MANUFACTURE OF GLASSWARE.
(Application filed July 17, 1900.)

(No Model.) 2 Sheets—Sheet 2.

Witnesses
Geo. E. Fisch.
Chas. R. Wright Jr.

Inventor
C. E. Blue,
By A. S. Pattison, Attorney

UNITED STATES PATENT OFFICE.

CHARLES EDWIN BLUE, OF WHEELING, WEST VIRGINIA.

MACHINE FOR THE MANUFACTURE OF GLASSWARE.

SPECIFICATION forming part of Letters Patent No. 682,906, dated September 17, 1901.

Application filed July 17, 1900. Serial No. 23,936. (No model.)

*To all whom it may concern:*

Be it known that I, CHARLES EDWIN BLUE, a citizen of the United States, residing at Wheeling, in the county of Ohio and State of West Virginia, have invented new and useful Improvements in Machines for the Manufacture of Glassware, of which the following is a specification.

My invention relates to improvements in machines for the manufacture of glassware, which will be fully described hereinafter.

This invention has in view, first, the combination of specially-constructed blow and press molds whereby a plurality of blanks can be simultaneously pressed and the said two blanks afterward simultaneously blown.

The present invention has in view, secondly, the combination, with said specially-constructed press and blow molds, of specially constructed and arranged blowing mechanisms and plungers.

Figure 1:
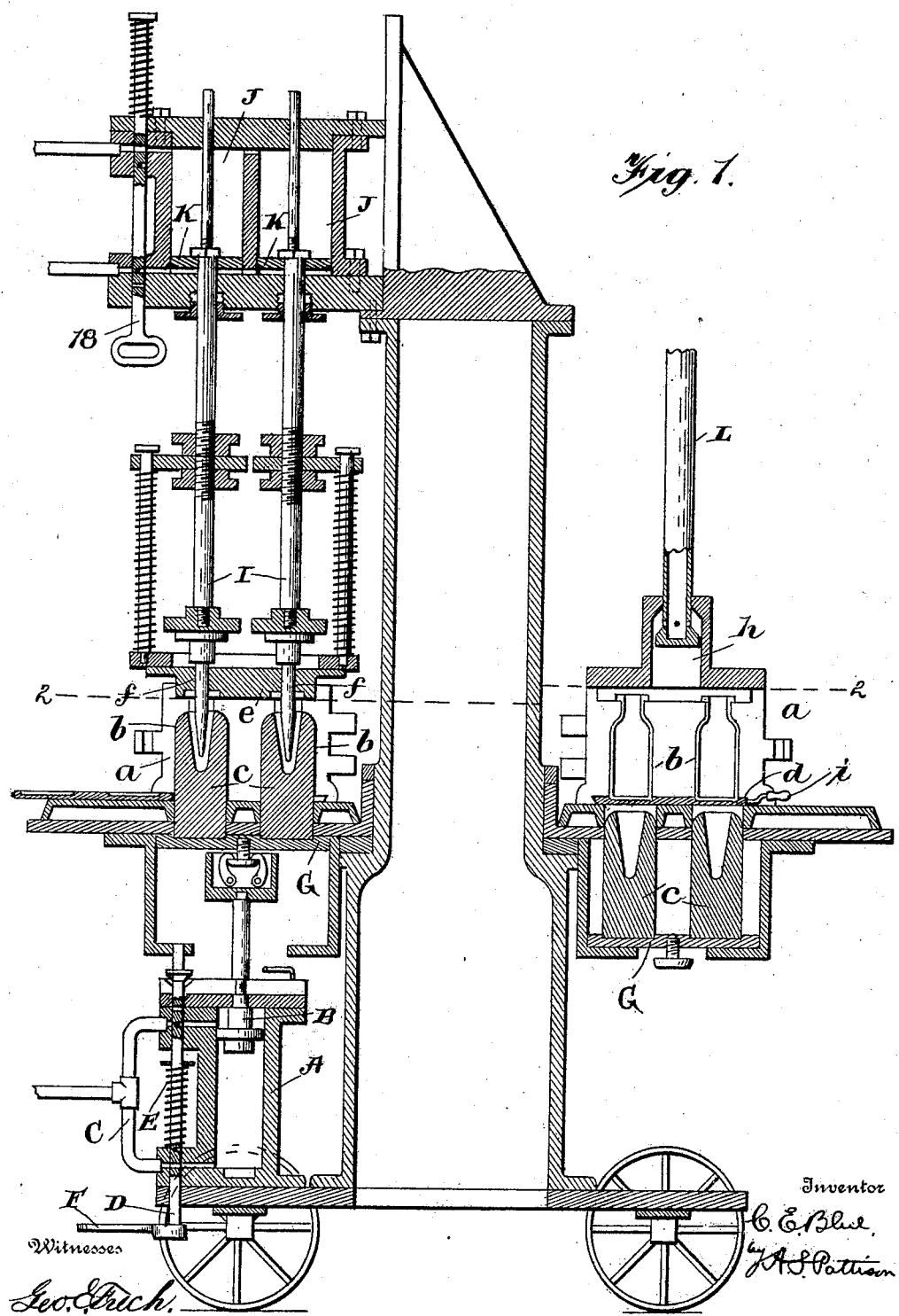
Figure 2:
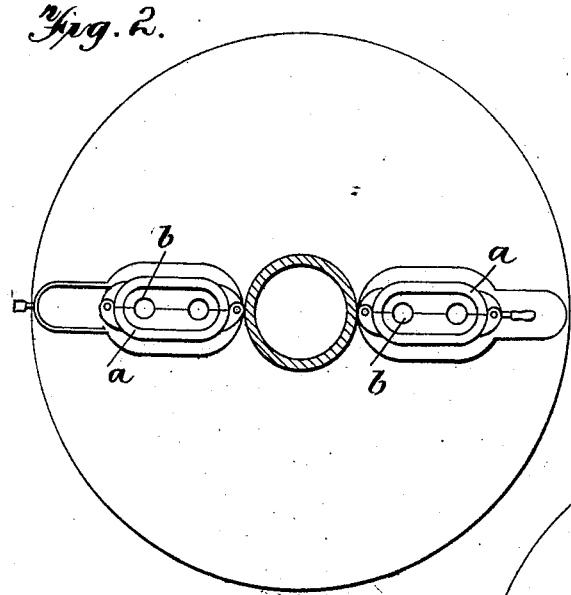
Figure 5:
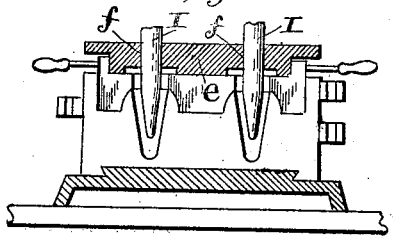
Figure 3:
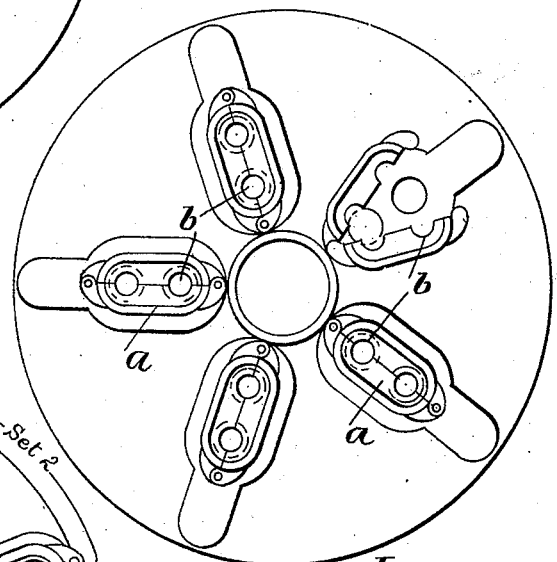
Figure 4:
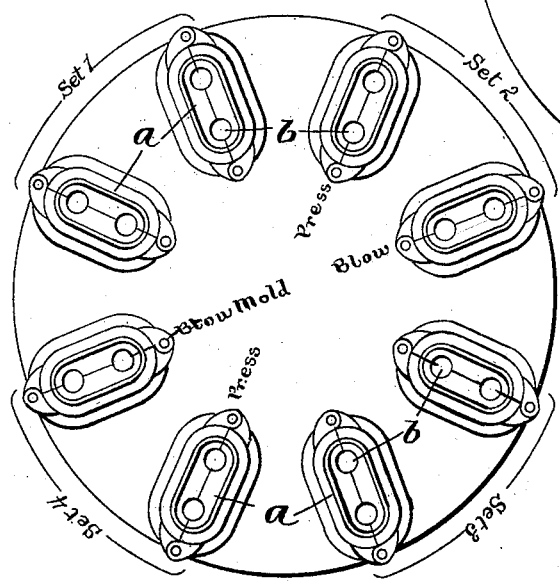
Figure 6:
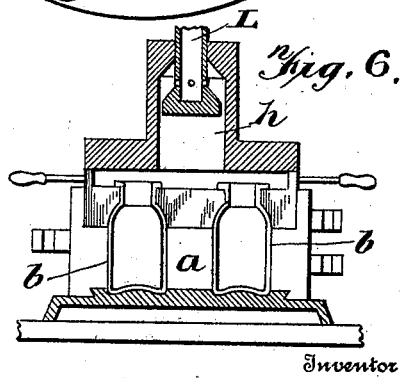

In the accompanying drawings, Figure 1 is a longitudinal central sectional view of a machine embodying my invention. Fig. 2 is a sectional plan view on the dotted line 2 2 of Fig. 1. Fig. 3 is a plan view of the revolving member, showing five molds thereon instead of two, as in Fig. 2. Fig. 4 is a plan view of the revolving member, showing a plurality of sets of separate blow and press molds. Fig. 5 is a vertical central sectional view of one of the press-molds used in Fig. 4. Fig. 6 is a similar view of one of the blow-molds used in Fig. 4.

The preferred form of my invention is shown in Figs. 1 and 2, and these will be first described. In said figures of the drawings, *a* is a mold-body having a plurality of blow-cavities *b*, which are adapted to receive the insertible and removable press-molds *c* and the insertible and removable blow-mold bottoms *d*. A presser-head *e* is provided, which has plunger-openings *f*, which are so located that they are directly over the blow and press molds, respectively, when they are being used. The blow-head *h* is adapted to rest upon the neck-ring and is constructed to be simultaneously in communication with both the blow-molds. Any suitable mechanism can be provided for inserting and withdrawing the press-molds blow-mold bottoms and for operating the plungers. As here shown, the blow-mold bottoms are inserted and withdrawn by hand, through the medium of any suitable handle, as *i*, and the means here shown for controlling the press-molds is a cylinder A and piston B. Air or other fluid pressure is admitted to opposite ends of the cylinder through the pipes C and is controlled by a suitable valve D, held normally upward by means of a spring E and adapted to be depressed by a footpiece F. The upper end of the piston-rod is adapted to engage with a vertically-movable press-mold support G. The presser-head in this machine is provided with two plungers I, which are simultaneously carried into their operative position within the press-molds, and it is highly desirable that these plungers, though simultaneously operated, should be capable of an independent movement to accommodate themselves to any variation in the quantity of glass placed in the respective molds. This may be accomplished in several ways, one instance being that, as here shown, the plungers are simultaneously though independently actuated, which will permit them to have independent movements, as just described. The instance here shown consists in providing a corresponding number of cylinders J, carrying pistons K, to which the upper ends of the plunger-rods are connected. Air or other fluid pressure is admitted simultaneously to opposite ends of these cylinders and it is controlled through the medium of a suitable hand-valve 18. The pressure-supply to these cylinders is adapted to simultaneously depress the plunger-rods and in turn the plungers, though independently, which will permit one to move down farther than the other to accommodate itself to the variations in the quantity of glass supplied to the press-mold with which it is coacting, as will be readily understood. The blow-head *h* may be raised and lowered in any convenient manner, or by hand, and the blow-head is provided with a pipe L, which will be in communication with any suitable source of pressure-supply.

In Fig. 3 I show a modification of the construction shown in Figs. 1 and 2 in that in said figure there are shown five sets of molds instead of two, as shown in Figs. 1 and 2.

In Figs. 4, 5, and 6 I show the blow-molds so constructed that the press-molds do not move therein, but are isolated therefrom, the sets of molds 1, 2, 3, and 4 of Fig. 4 each containing two press-molds and two blow-molds. In this instance the presser-head e is lifted from the press-molds and the suspended blank carried to the blow-molds or the blow-molds carried to the suspended blanks and then the blank lowered into the said mold to be blown. In other respects the construction to be used in connection with Figs. 4, 5, and 6 may be the same as that shown in connection with the molds in Fig. 1.

By means of the novel construction, combination, and relative arrangement of the parts herein shown and described I am enabled to nearly double the output of machines of this character heretofore produced, and which is therefore a great step in cheapening the production of blown articles.

Having thus described my invention, what I claim, and desire to secure by Letters Patent, is—

A machine for the manufacture of pressed and blown glassware, comprising a plurality of simultaneously-acting press-molds, a plurality of simultaneously-acting blow-molds, a presser-head, a plurality of plungers independently movable through the said presser-head, means independent of the said presser-head for simultaneously and independently operating the said plungers, and a blow-head having simultaneous communication with the blow-molds.

In testimony whereof I have hereunto set my hand in the presence of two subscribing witnesses.

CHARLES EDWIN BLUE.

Witnesses:
T. F. THONER,
W. V. HOGE, Jr.